United States Patent
Dietz et al.

(10) Patent No.: US 6,737,501 B2
(45) Date of Patent: May 18, 2004

(54) PROCESS FOR THE PREPARATION OF COPOLYMERIC HYDROPHOBICALLY MODIFIED POLYGLUTAMIC ACID DERIVATIVES AND THEIR USE

(75) Inventors: Thomas Dietz, Essen (DE); Erika Messinger, Arolsen/Schmillinghausen (DE); Peter Muss, Essen (DE); Ute Schick, Essen (DE); Christian Weitemeyer, Essen (DE); Astrid Zündorff, Essen (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 10/336,380

(22) Filed: Jan. 3, 2003

(65) Prior Publication Data

US 2003/0130479 A1 Jul. 10, 2003

(30) Foreign Application Priority Data

Jan. 3, 2002 (DE) .......................................... 102 00 075

(51) Int. Cl.$^7$ ........................ C08G 73/10; C08G 63/48; C08G 63/91; C08F 283/00; C08H 1/00
(52) U.S. Cl. .................... 528/328; 528/363; 525/54.11; 525/419; 525/420
(58) Field of Search ................................ 528/328, 363; 525/420, 419, 54.11

(56) References Cited

U.S. PATENT DOCUMENTS

| | | | | |
|---|---|---|---|---|
| 3,052,655 | A | | 9/1962 | Fox et al. .................... 528/328 |
| 5,057,597 | A | | 10/1991 | Koskan ....................... 528/328 |
| 5,175,285 | A | * | 12/1992 | Lehmann et al. ............. 528/341 |
| 5,888,959 | A | * | 3/1999 | Kroner et al. ............... 510/361 |
| 6,355,771 | B1 | * | 3/2002 | Oda ........................... 528/328 |
| 6,380,350 | B1 | * | 4/2002 | Mukouyama et al. ....... 528/328 |
| 6,590,061 | B1 | * | 7/2003 | Rypacek et al. ............. 528/288 |

FOREIGN PATENT DOCUMENTS

| | | |
|---|---|---|
| DE | 3612102 A1 | 10/1986 |
| DE | 3921912 A1 | 1/1991 |
| EP | 0 959 091 A1 | 11/1999 |

* cited by examiner

*Primary Examiner*—P. Hampton Hightower
(74) *Attorney, Agent, or Firm*—Scully, Scott, Murphy & Presser

(57) ABSTRACT

Process for the preparation of copolymeric polypeptides, which comprises, in a first stage, reacting glutamic acid and/or derivatives thereof with amines in the absence of solvents and catalysts, under condensation conditions and, in a second stage, adding one or more further amino acids and/or derivatives thereof and/or one or more identical and/or further amines simultaneously or in any desired order, and reacting them with the reaction product of the first stage in the absence of solvents and catalysts.

13 Claims, No Drawings

PROCESS FOR THE PREPARATION OF COPOLYMERIC HYDROPHOBICALLY MODIFIED POLYGLUTAMIC ACID DERIVATIVES AND THEIR USE

DESCRIPTION

1. Field of the Invention

The present invention relates to hydrophobically modified copolymeric polyglutamic acid derivatives and to a process for their preparation by condensation of glutamic acid or derivatives thereof with amines and coamino acids. The present invention also relates to the use of the hydrophobically modified copolymeric polyglutamic acid derivatives of the present invention.

2. Background of the Invention

Polypeptides, constructed from naturally occurring amino acids, are readily biodegradable and toxicologically safe. Moreover, polypeptides are valuable additives which, due to their properties, have received particular attention and are being used to an increasing extent.

Depending on the grade of amidation and hydrophobicity of the amine component, polyglutamides, in addition to their toxicological safety, their excellent mildness and biodegradability, are characterized by excellent properties as film formers and coatings, particularly in pharmacy and in the food sector. In addition, applications as biodegradable complexing agents, softeners and detergent builders are proposed.

The literature describes a large number of polypeptides and processes for their preparation, in particular those based on aspartic acid.

U.S. Pat. No. 5,057,597 describes the thermal polymerization of solid aspartic acid in a moving-bed or fluidized-bed reactor at temperatures of at least 180° C. to 250° C., where the reaction mixture remains flowable throughout the entire process.

U.S. Pat. No. 3,052,655 describes the preparation of copolymeric polypeptides which, in addition to aspartic acid, can also contain one or more other α-amino acids. To prepare a liquid reaction mixture, the addition of an equimolar amount, based on the total amount of the amino acids, of concentrated phosphoric acid is required.

DE-A-36 12 102 discloses soluble and biodegradable copolymeric polypeptide amides, which, in the main chain, contain aspartic acid and/or glutamic acid units and units of other amino acids, and in which the hydrocarbon radical of the amide moiety can have 3 to 7 carbon atoms. These prior art compounds have molar masses of from 5,000 to 1,000,000 and are used, following reaction with amino alcohols or hydrazine, for binding biologically active substances.

EP-A-0 959 091 relates to copolymeric polyaspartic ester amides which have been modified with alkyl or alkenyl radicals having 6 to 30 carbon atoms, as well as their preparation and their use. As a result of the preparation process of the polyaspartic acid in which, in the first step, maleic monoesters are reacted with ammonia, and subsequent (partial) hydrolysis of the ester bonds, followed by the amidation of the free carboxyl groups, this prior art process forms products that still contain ester bonds.

According to DE-A-39 21 912, reaction products from polysuccinimide and amines having 1 to 8 carbon atoms in the hydrocarbon radical, which, in addition to the amide groups, also contain imide groups and optionally free carboxyl groups or ammonium salts thereof, can be used as coatings and/or retardants for medicaments and foods. The amidation of the polysuccinimide is carried out in dimethylformamide (DMF) as solvent, which in turn has to be removed afterward by laborious process steps and using large amounts of less acceptable solvents.

SUMMARY OF THE INVENTION

An object of the present invention is to provide simpler and more effective processes for the preparation of optionally copolymeric polypeptides, in particular those based on glutamic acid and aspartic acid, which, through simple variation of the starting materials and/or the reaction parameters, permits polymers with a predetermined distribution of the monomers within the molecule, i.e., from random distribution to the desired block formation, and also the setting of tailored molecular weights.

It has now been found that the foregoing object is achieved by a process for the preparation of optionally copolymeric polypeptides by simultaneous or stepwise reaction of glutamic acid and at least one further α-amino acid and/or derivatives thereof with amines in the absence of solvents and catalysts under condensation conditions, optionally at subatmospheric pressure and with removal of the condensate from the reaction mixture.

The present invention therefore provides a process for the preparation of copolymeric polypeptides which comprises, in a first stage, reacting glutamic acid and/or derivatives thereof with amines in the absence of solvents and catalysts under condensation conditions, optionally at subatmospheric pressure and with removal of the condensate from the reaction mixture and, in a second stage, adding one or more further amino acids and/or derivatives thereof and/or one or more identical and/or further amines simultaneously or in any desired order, and reacting them with the reaction product of the first stage in the absence of solvents and catalysts.

The present invention further provides a process for the preparation of optionally copolymeric polypeptides, which comprises, in a first stage, reacting glutamic acid and/or derivatives thereof with one or more further α-amino acids and/or derivatives thereof in the absence of solvents and catalysts under condensation conditions, optionally at subatmospheric pressure and with removal of the condensate from the reaction mixture and, in a second stage, reacting one or more amines simultaneously or in any desired order with the reaction product of the first stage in the absence of solvents and catalysts, under condensation conditions, optionally at subatmospheric pressure and with removal of the condensate from the reaction mixture.

The present invention further provides a process for the preparation of optionally copolymeric polypeptides, which comprises, in a first stage, reacting glutamic acid and/or derivatives thereof with one or more further α-amino acids and/or derivatives thereof, with one or more amines simultaneously or in any desired order in the absence of solvents and catalysts, under condensation conditions, optionally at subatmospheric pressure and with removal of the condensate from the reaction mixture and, in a second stage, reacting glutamic acid and/or one or more further coamino acids and/or derivatives thereof and/or one or more identical and/or further amines simultaneously or in any desired order with the reaction product of the first stage in the absence of solvents and catalysts under condensation conditions, optionally at subatmospheric pressure and with removal of the condensate from the reaction mixture.

The present invention further provides a process for the preparation of optionally copolymeric polypeptides, which comprises, in a first stage, mixing at least one amino acid and/or derivatives thereof with amines in a ratio such that the mixtures are liquid at the condensation temperature, and heating them in the absence of solvents and catalysts to at least the melting temperature and, in a second stage, optionally metering in further coamino acids and/or amines simultaneously or in any desired order, and reacting the mixture with the mixture or the reaction product of the first stage under condensation conditions, optionally at subatmospheric pressure and with removal of the condensate from the reaction mixture.

DETAILED DESCRIPTION OF THE INVENTION

The present invention, which provides processes for producing hydrophobically modified polyglutamic acid derivatives, will now be described in more detail.

In accordance with the present invention, 30 to 90%, by weight, of the units present in the inventive copolymers consist of structural units of general formula (I), and 70 to 30%, by weight, of the units consist of structural units of general formula (II)

$$\left[\!\!\begin{array}{c}\text{NH}\!-\!\text{A}\!-\!\text{CO}\\|\\R^1\end{array}\!\!\right] \quad (I)$$

$$\left[\!-\!\text{NH}\!-\!\text{B}\!-\!\text{CO}\!-\!\right] \quad (II)$$

in which

A is a trifunctional radical with three carbon atoms and has one of the following structures

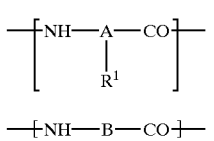

(A1)

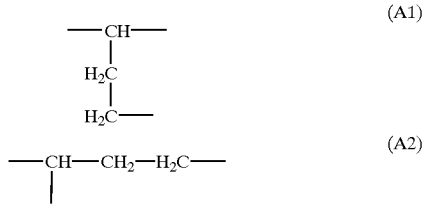

(A2)

and in which
  $R^1$ can have the meaning of $R^2$, $R^3$ and $R^4$, where
    $R^2$ is identical or different amide radicals —C(O)NH— $R^9$ where
      $R^9$ is straight-chain or branched, saturated and unsaturated alkyl radicals having 1 to 24, preferably 6 to 24, carbon atoms or radicals of the structure —C(O)NH—X—$R^9$, where
      X is an oligo- or polyoxyalkylene chain having 1 to 100 oxyalkylene units, preferably ethylene oxide units,
    $R^3$ are identical or different amide radicals —C(O) NH—$(CH_2)_n$—N$(R^{10})(R^{11})$ where
      n is 2 to 10, preferably 2 to 4, and
      $R^{10}$, $R^{11}$, independently of one another, are straight-chain or branched, saturated or unsaturated alkyl radicals having 1 to 24 carbon atoms and/or hydroxyalkyl radicals,
    $R^4$ has the meaning COO$^-$X$^+$, where
      X$^+$ is one or more radicals selected from the group of alkali metals, alkaline earth metals, hydrogen or ammonium, [NR$^5$R$^6$R$^7$R$^8$]$^+$, in which
        $R^5$ to $R^8$, independently of one another, are hydrogen, alkyl or hydroxyalkyl or [NH$_3$—X—R$^9$]$^+$, and/or [NH$_3$—R$^9$]$^+$, and/or [NH$_3$—$(CH_2)_n$—N$(R^{10})$ $(R^{11})$]$^+$, and, in each case, at least one radical $R^1$ must have the meaning of $R^2$, $R^3$ and/or $R^4$ and the units [—NH—B—CO—] are building blocks from the group of proteinogenic and/or nonproteinogenic amino acids ($H_2N$—B—COOH), in which B is the radical of the respective amino acid.

Suitable amino acid building blocks [—NH—B—CO] from the group of proteinogenic amino acids $H_2N$—B—COOH are, for example, glycine, alanine, leucine, isoleucine, phenylalanine, tyrosine, serine, cysteine, methionine, glutamic acid, glutamine, aspartic acid, asparagine, lysine, hydroxylysine, arginine, tryptophan, histidine, valine, threonine, proline, hydroxyproline and derivatives thereof. Nonproteinogenic amino acids may, for example, be β-alanine, ω-amino-1-alkanoic acids, and etc.

Suitable amines which can be co-used according to the present invention are compounds which contain at least one amino group which can react with carboxyl groups, such as, for example: $NH_2$—$R^9$ and/or $NH_2$—X—$R^9$ and/or $NH_2$—$(CH_2)_n$—N$(R^{10})(R^{11})$, in which $R^9$, $R^{10}$, $R^{11}$, X and n have the meanings given above.

Preference is given in the present invention to using those compounds which are liquid under the given reaction conditions and do not distill off from the reaction mixture. Such amines are the higher amines having 6 or more carbon atoms in the alkyl chain such as the homologous series of the fatty amines $NH_2$—$R^9$.

These fatty amines are prepared by known processes by reacting fatty acids with $NH_3$ in the presence of catalysts to give the nitrile and subsequent hydrogenation to give the primary or secondary amine.

The fatty acids co-used here are, individually or in mixtures, acids such as caprylic acid, capric acid, 2-ethylhexanoic acid, lauric acid, myristic acid, palmitic acid, palmitoleic acid, isostearic acid, stearic acid, hydroxystearic acid (ricinoleic acid), dihydroxystearic acid, oleic acid, linoleic acid, petroselic acid, elaidic acid, arachidic acid, behenic acid and erucic acid, gadoleic acid and the technical-grade mixtures which form during the pressurized cleavage of natural fats and oils, such as oleic acid, linoleic acid, linolenic acid, and in particular rapeseed oil fatty acid, soybean oil fatty acid, sunflower oil fatty acid, tall oil fatty acid. Suitable in principle are all fatty acids with a similar chain distribution.

The content of unsaturated fractions in these fatty acids or fatty acid esters is, wherever necessary, adjusted to a desired iodine number by known catalytic hydrogenation processes, or is achieved by admixing completely hydrogenated fatty components with nonhydrogenated fatty components. The iodine number, which represents a measure of the average degree of saturation of a fatty acid, is the amount of iodine that is absorbed by 100 g of the compound to saturate the double bonds.

Preference is given to using partially hydrogenated $C_{8-18}$-coconut and palm fatty acids, rapeseed oil fatty acids, sunflower oil fatty acids, soybean oil fatty acids and tall oil fatty acids having iodine numbers in the range from about 80 to 150 and, in particular, technical-grade $C_{8-18}$-coconut fatty acids, where in some instances, it may be advantageous to use cis/trans isomers, such as elaidic acid-rich $C_{16-18}$-fatty acid cuts. The fatty acids employed in the present invention are commercially available products and are supplied by various companies under their respective trade names.

Further amines which can be co-used are those of the general formula $NH_2$—$(CH_2)_n$—N$(R^{10})(R^{11})$ which, in addition to a primary amino group, also contain at least one secondary, or preferably, tertiary amino group, in particular dimethylaminopropylamine (DMAPA).

Further amines that can be co-used in the present invention are those of the general formula $NH_2$—X—$R^\circ$, such as, in particular, the compounds sold by Huntsman under the trade name Jeffamine®.

Further amines that can be co-used in the present invention are compounds which contain imidazoline rings, such as, for example, those which are prepared from the above-listed fatty acids and diethylenetriamine by known methods.

In the compounds prepared in accordance with the present invention, the glutamic acid/coamino acid ratio is: 90:10 to 30:70%, by weight, preferably 90:10 to 50:50%, by weight, and the amino acids/amine ratio is: 90:10 to 30:70%, by weight, preferably 40:60 to 60:40, by weight.

Preparation Processes:

In a first stage, glutamic acid is melted, for example, at 170° to 190° C., during which the cyclic amide, pyroglutamic acid, forms as a result of the elimination of water. Aspartic acid and/or other coamino acids are then added and the melt is heated further at the same temperature. The water of reaction which forms is distilled off continuously. Typically, the longer the heating time and the higher the temperature, the greater the molecular mass of the resulting peptide. This peptide can also be prepared in a stepless process, where coamino acid, glutamic acid and optionally further amino acids are heated and polymerized simultaneously at the same temperature.

In the next step, amines are added to the peptide and reacted further at 170° to 190° C. The resulting melt is either poured out and comminuted after cooling, or treated directly afterward with aqueous bases, e.g., aqueous sodium hydroxide solution. The suspension formed in this way can either be further used directly or isolated.

In one process variant, the amine is added after the glutamic acid, and only in the subsequent step are aspartic acid and/or other coamino acids added thereto.

In a further process variant, all of the components can be mixed together and reacted under the conditions stated.

The following examples are provided to illustrate the process of the present invention.

EXAMPLE 1

221 g of glutamic acid and 200 g of aspartic acid were introduced under a gentle stream of nitrogen into a 2 l flat-flange flask fitted with an oil bath, stirrer, thermometer and distillation bridge, and heated to 180° C. The water of reaction which forms was distilled off over the distillation bridge and condensed.

After 54 g of water have distilled off, 105 g of stearylamine (Armeen 18 D from Akzo Nobel) were then slowly added over the course of half an hour and the mixture was stirred for a further half an hour at the same temperature. At 140° C., a 25% strength sodium hydroxide solution was added until a pH of 5 had been established. The product was bleached by adding 1 g of aminoiminomethanesulfinic acid at 80° C. for one hour. 10 g of 30% strength hydrogen peroxide solution were then added and the mixture was stirred for a further hour at 80° C.

The product was concentrated on a rotary evaporator. The residual amounts of the amino acids were determined by means of HPLC. This gave a pale-beige 50% strength suspension with about 5% free aspartic acid and 18% pyroglutamic acid.

EXAMPLE 2

80 g of glutamic acid, 320 g of aspartic acid and 100 g of stearylamine (Armeen 18 D from Akzo Nobel) were introduced, under a gentle stream of nitrogen, into a 2 l flat-flange flask fitted with an oil bath, stirrer, thermometer and distillation bridge, and heated to 190° C. After 1.5 h, the temperature was increased to 220° C. and the mixture was stirred for a further 2.5 h. The water of reaction which forms (53 g) was distilled off via the distillation bridge and condensed.

At 140° C., a 25% strength sodium hydroxide solution and water were added until a pH of 7 had been established. The product was bleached by adding 1 g of aminoiminomethanesulfinic acid at 80° C. over the course of an hour. 10 g of 30% strength hydrogen peroxide solution were then added and the mixture was stirred for another hour at 80° C.

The product was concentrated on a rotary evaporator. The residual amounts of the amino acids were determined by means of HPLC. A pale-beige 29% strength suspension with about 14% free aspartic acid, 2% glutamic acid and 3% pyroglutamic acid was obtained.

EXAMPLE 3

250 g of glutamic acid were introduced, under a gentle stream of nitrogen, into a 2 l flat-flange flask fitted with an oil bath, stirrer, thermometer and distillation bridge, and heated to 180° C. The water of reaction which forms was distilled off over the distillation bridge and condensed (30 g). After 1.5 h, 119 g of stearylamine were added and the mixture was stirred for 0.5 h at 180° C. Then, 226 g of aspartic acid were added and, after 1 h, 26 g of water had been distilled off.

At 150° C., a 25% strength sodium hydroxide solution was added until a pH of 5 had been established. Concentration on a rotary evaporator gave a pale-yellow powder. The residual amounts of the amino acids were determined by means of HPLC. A modified peptide with 21% free aspartic acid, 18% pyroglutamic acid and 4% free glutamic acid was obtained.

EXAMPLE 4

500 g of glutamic acid and 45 g of aspartic acid were introduced, under a gentle stream of nitrogen, into a 2 l flat-flange flask fitted with an oil bath, stirrer, thermometer and distillation bridge, and heated to 220° C. The water of reaction which forms was distilled off over the distillation bridge and condensed (67 g).

105 g of stearylamine (Armeen 18 D from Akzo Nobel) were then slowly added over the course of half an hour. At 140° C., a 25% strength sodium hydroxide solution was added until a pH of 7 had been established.

The product was concentrated on a rotary evaporator. The residual amounts of the amino acids were determined by means of HPLC. A yellow powder with about 2% free glutamic acid and 50% pyroglutamic acid was obtained.

EXAMPLE 5

74 g of glutamic acid and 67 g of aspartic acid were introduced, under a gentle stream of nitrogen, into a 2 l flat-flange flask fitted with an oil bath, stirrer, thermometer and distillation bridge, and heated to 180° C. The water of reaction which forms was distilled off over the distillation bridge and condensed (18 g).

Then, over the course of half an hour, 270 g of stearylamine (Armeen 18 D from Akzo Nobel) were slowly added, and the mixture was stirred for a further 0.5 hours at 150° C. At 140° C., a 25% strength sodium hydroxide solution was added until a pH of 7 had been established. The product was concentrated on a rotary evaporator. The residual amounts of the amino acids were determined by means of HPLC. This gave a modified peptide with about 2% free aspartic acid and 5% pyroglutamic acid.

EXAMPLE 6

221 g of glutamic acid and 200 g of aspartic acid were introduced, under a gentle stream of nitrogen, into a 2 l flat-flange flask fitted with an oil bath, stirrer, thermometer and distillation bridge, and heated to 180° C. The water of reaction which forms was distilled off over the distillation bridge and condensed.

After 54 g of water have been distilled off, 307 g of dimethylaminopropylamine were slowly added over the course of an hour, and the mixture was stirred for a further hour at the same temperature. A brown solution which, after cooling, was of high viscosity and tacky was obtained.

EXAMPLE 7

200 g of glutamic acid and 200 g of aspartic acid were introduced, under a gentle stream of nitrogen, into a 2 l flat-flange flask fitted with an oil bath, stirrer, thermometer and distillation bridge, and heated to 180° C. The water of reaction which forms was distilled off over the distillation bridge and condensed.

After 52 g of water have been distilled off, 100 g of stearylamine (Armeen 18 D from Akzo Nobel) were slowly added over the course of half an hour, and the mixture was stirred for a further half an hour at the same temperature. 100 g of glycine were then added over the course of half an hour, and again the mixture was stirred for half an hour at a uniform temperature. At 140° C., a 25% strength sodium hydroxide solution was added until a pH of 7 had been established. A brown suspension with about 54% of solids content was obtained.

EXAMPLE 8

200 g of glutamic acid and 181 g of aspartic acid were introduced, under a gentle stream of nitrogen, into a 2 l flat-flange flask fitted with an oil bath, stirrer, thermometer and distillation bridge, and heated to 180° C. The water of reaction which forms was distilled off over the distillation bridge and condensed.

After 48 g of water have been distilled off, the mixture was stirred for half an hour at the same temperature. Then, over the course of half an hour, 95 g of polyoxyalkyleneamine (Jeffamine M-600 from Huntsman) were slowly added and the mixture was stirred for a further half an hour at the same temperature. At 140° C., a 25% strength sodium hydroxide solution was added until a pH of 5 had been established. The product was bleached by adding 1 g of aminoiminomethanesulfinic acid at 80° C. for one hour. 10 g of 30% strength hydrogen peroxide solution were then added and the mixture was stirred for a further hour at 80° C. The product was concentrated on a rotary evaporator. The residual amounts of the amino acids were determined by means of HPLC. A 53% strength clear pale-brown solution with about 5% free aspartic acid and 22% pyroglutamic acid was obtained.

While the present invention has been particulary shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A process for preparing copolymeric polypeptides comprising, in a first stage, reacting glutamic acid, derivatives of glutamic acid or mixtures thereof with amines in the absence of solvents and catalysts, under condensation conditions to form a reaction product and, in a second stage, adding one or more further amino acids, derivatives of amino acids or mixtures thereof and/or one or more identical and/or further amines simultaneously, or in any desired order, and reacting the one or more amino acids and/or amines with the reaction product of the first stage in the absence of solvents and catalysts.

2. A process for preparing copolymeric polypeptides comprising, in a first stage, reacting glutamic acid, derivatives of glutamic acid or mixtures thereof with one or more further α-amino acids, derivatives of α-amino acids or mixtures thereof in the absence of solvents and catalysts, under condensation conditions to form a reaction product and, in a second stage, adding one or more amines simultaneously or, in any desired order, and reacting the one or more amines with the reaction product of the first stage under condensation conditions and in the absence of solvents and catalysts.

3. A process for preparing copolymeric polypeptides comprising, in a first stage, reacting glutamic acid, derivatives of glutamic acid or mixtures thereof with one or more further α-amino acids, derivatives of α-amino acids or mixtures thereof and with one or more amines simultaneously or, in any desired order, in the absence of solvents and catalysts, under condensation conditions to form a reaction product and, in a second stage, adding glutamic acid, and/or one or more further coamino acids, and/or derivatives thereof, and/or one or more identical and/or further amines simultaneously or, in any desired order, and, in the absence of solvents and catalysts, reacting the acids and/or amines with the reaction product of the first stage under condensation conditions.

4. The process of claim 1 wherein the amino acids co-used are compounds of the general formula (II)

    (II)

in which

B is the radical of a proteinogenic and/or nonproteinogenic amino acid.

5. The process of claim 2 wherein the amino acids co-used are compounds of the general formula (II)

    (II)

in which

B is the radical of a proteinogenic and/or nonproteinogenic amino acid.

6. The process of claim 3 wherein the amino acids co-used are compounds of the general formula (II)

    (II)

in which

B is the radical of a proteinogenic and/or nonproteinogenic amino acid.

7. The process of claim 4 wherein B is the radical selected from the group of proteinogenic amino acids glycine, alanine, leucine, isoleucine, phenylalanine, tyrosine, serine, cysteine, methionine, glutamic acid, glutamine, aspartic acid, asparagine, lysine, hydroxylysine, arginine, tryptophan, histidine, valine, threonine, proline, hydroxyproline and/or the nonproteinogenic amino acids β-alanine, ω-amino-1-alkanoic acids.

8. The process of claim 5 wherein B is the radical selected from the group of proteinogenic amino acids glycine, alanine, leucine, isoleucine, phenylalanine, tyrosine, serine, cysteine, methionine, glutamic acid, glutamine, aspartic acid, asparagine, lysine, hydroxylysine, arginine, tryptophan, histidine, valine, threonine, proline, hydroxyproline and/or the nonproteinogenic amino acids β-alanine, ω-amino-1-alkanoic acids.

9. The process of claim 6 wherein B is the radical selected from the group of proteinogenic amino acids glycine, alanine, leucine, isoleucine, phenylalanine, tyrosine, serine, cysteine, methionine, glutamic acid, glutamine, aspartic acid, asparagine, lysine, hydroxylysine, arginine, tryptophan, histidine, valine, threonine, proline, hydroxyproline and/or the nonproteinogenic amino acids β-alanine, ω-amino-1-alkanoic acids.

10. The process of claim 1 wherein the amines co-used are compounds of the general formulae $NH_2—R^9$ and/or $NH_2—X—R^9$ and/or $NH_2—(CH_2)_n—N(R^{10})(R^{11})$, in which $R^9$ is saturated or unsaturated alkyl radicals having 1 to 24, preferably 6 to 24, carbon atoms, $R^{10}$, $R^{11}$, independently of one another, are saturated or unsaturated alkyl radicals having 1 to 24 carbon atoms and/or hydroxyalkyl radicals, X is oligo- or polyoxyalkylene chains having 1 to 100 oxyalkylene units, and n is 2to 10.

11. The process of claim 2 wherein the amines co-used are compounds of the general formulae $NH_2—R^9$ and/or $NH_2—X—R^9$ and/or $NH_2—(CH_2)_n—N(R^{10})(R^{11})$, in which $R^9$ is saturated or unsaturated alkyl radicals having 1 to 24, preferably 6 to 24, carbon atoms, $R^{10}$, $R^{11}$, independently of one another, are saturated or unsaturated alkyl radicals having 1 to 24 carbon atoms and/or hydroxyalkyl radicals, X is oligo- or polyoxyalkylene chains having 1 to 100 oxyalkylene units, and n is 2to 10.

12. The process of claim 3 wherein the amines co-used are compounds of the general formulae $NH_2—R^9$ and/or $NH_2—X—R^9$ and/or $NH_2—(CH_2)_n—N(R^{10})(R^{11})$, in which $R^9$ is saturated or unsaturated alkyl radicals having 1 to 24, preferably 6 to 24, carbon atoms, $R^{10}$, $R^{11}$, independently of one another, are saturated or unsaturated alkyl radicals having 1 to 24 carbon atoms and/or hydroxyalkyl radicals, X is oligo- or polyoxyalkylene chains having 1 to 100 oxyalkylene units, and n is 2 to 10.

13. A polypeptide wherein 30 to 90%, by weight, of the units present consist of structural units of general formula (I) and 70 to 30%, by weight, consist of structural units of general formula (II)

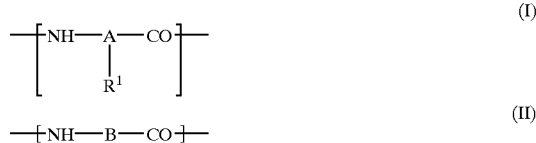

in which

A is a trifunctional radical with three carbon atoms and has the structures

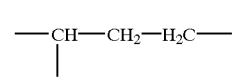

and in which $R^1$ may have the meaning of $R^2$, $R^3$ and $R^4$, where $R^2$ is identical or different amide radicals $—C(O)NH—R^9$ where $R^9$ is straight-chain or branched, saturated and unsaturated alkyl radicals having 1 to 24 carbon atoms or radicals of the structure $—C(O)NH—X—R^9$, where X is an oligo- or polyoxyalkylene chain having 1 to 100 oxyalkylene units, $R^3$ are identical or different amide radicals $—C(O)NH—(CH_2)_n—N(R^{10})(R^{11})$ where n is 2 to 10, and $R^{10}$, $R^{11}$, independently of one another, are straight-chain or branched, saturated or unsaturated alkyl radicals having 1 to 24 carbon atoms and/or hydroxyalkyl radicals $R^4$ has the meaning $COO^-X^+$, where $X^+$ is one or more radicals from the group of alkali metals, alkaline earth metals, hydrogen or ammonium, $[NR^5R^6R^7R^8]^+$, in which $R^5$ to $R^8$, independently of one another, are hydrogen, alkyl or hydroxyalkyl or $[NH_3—X—R^9]^+$, and/or $[NH_3—R^9]^+$, and/or $[NH_3—(CH_2)_n—N(R^{10})(R^{11})]^+$, and in each case at least one radical $R^1$ must assume the meaning of $R^2$, $R^3$ and/or $R^4$ and the units [—NH—B—CO—] are building blocks selected from the group of proteinogenic and/or nonproteinogenic amino acids ($H_2N—B—COOH$), in which B is the radical of the respective amino acid.

* * * * *